(12) United States Patent
Strasser et al.

(10) Patent No.: US 6,175,594 B1
(45) Date of Patent: Jan. 16, 2001

(54) METHOD AND APPARATUS FOR DECODING COMPRESSED VIDEO

(75) Inventors: David A. Strasser, Toronto; Allen J. Porter, Thornhill; Paul Chow, Richmond Hill, all of (CA)

(73) Assignee: ATI Technologies, Inc., Thornhill (CA)

( * ) Notice: Under 35 U.S.C. 154(b), the term of this patent shall be extended for 0 days.

(21) Appl. No.: 09/083,405

(22) Filed: May 22, 1998

(51) Int. Cl.[7] .............................. H04N 7/12; H04N 11/02; H04N 11/04
(52) U.S. Cl. ........................................ 375/240.2; 348/403
(58) Field of Search .................................. 348/403, 400; 382/233, 234, 248; 708/400, 402; 375/240.2, 240.21, 240.22

(56) References Cited

U.S. PATENT DOCUMENTS

| | | | |
|---|---|---|---|
| 5,345,408 | * | 9/1994 | Hoogenboom ..................... 708/402 |
| 5,410,350 | * | 4/1995 | Kato et al. ........................... 348/400 |
| 5,729,484 | * | 3/1998 | Mack et al. ......................... 708/400 |
| 5,809,173 | * | 9/1998 | Liu et al. ............................. 382/233 |
| 5,872,866 | * | 2/1999 | Strongin et al. ..................... 382/233 |
| 5,963,222 | * | 10/1999 | Cheney et al. ...................... 345/516 |
| 5,978,508 | * | 11/1999 | Tsuboi ................................. 382/234 |
| 5,999,657 | * | 12/1999 | Yasuhiko ............................. 382/248 |

* cited by examiner

Primary Examiner—Howard Britton
Assistant Examiner—Nhon T Diep
(74) Attorney, Agent, or Firm—Markison & Reckamp, P.C.

(57) ABSTRACT

A method and apparatus for video decoding of compressed video data begins by generating a plurality of coefficients based on run level data of two-dimensional frequency components corresponding to the compressed video data. As the coefficients are generated, they are stored in a coefficient section of memory. Once the coefficients have been stored, they are utilized to generate intermediate results. As the intermediate results are being generated, they are stored in an intermediate section of the memory. Next, representations of the video data are generated based on the intermediate results and stored in an output section of the memory. The storing and retrieving of the coefficients, intermediate results, and representations of the video data are done in a time multiplexed manner.

23 Claims, 3 Drawing Sheets

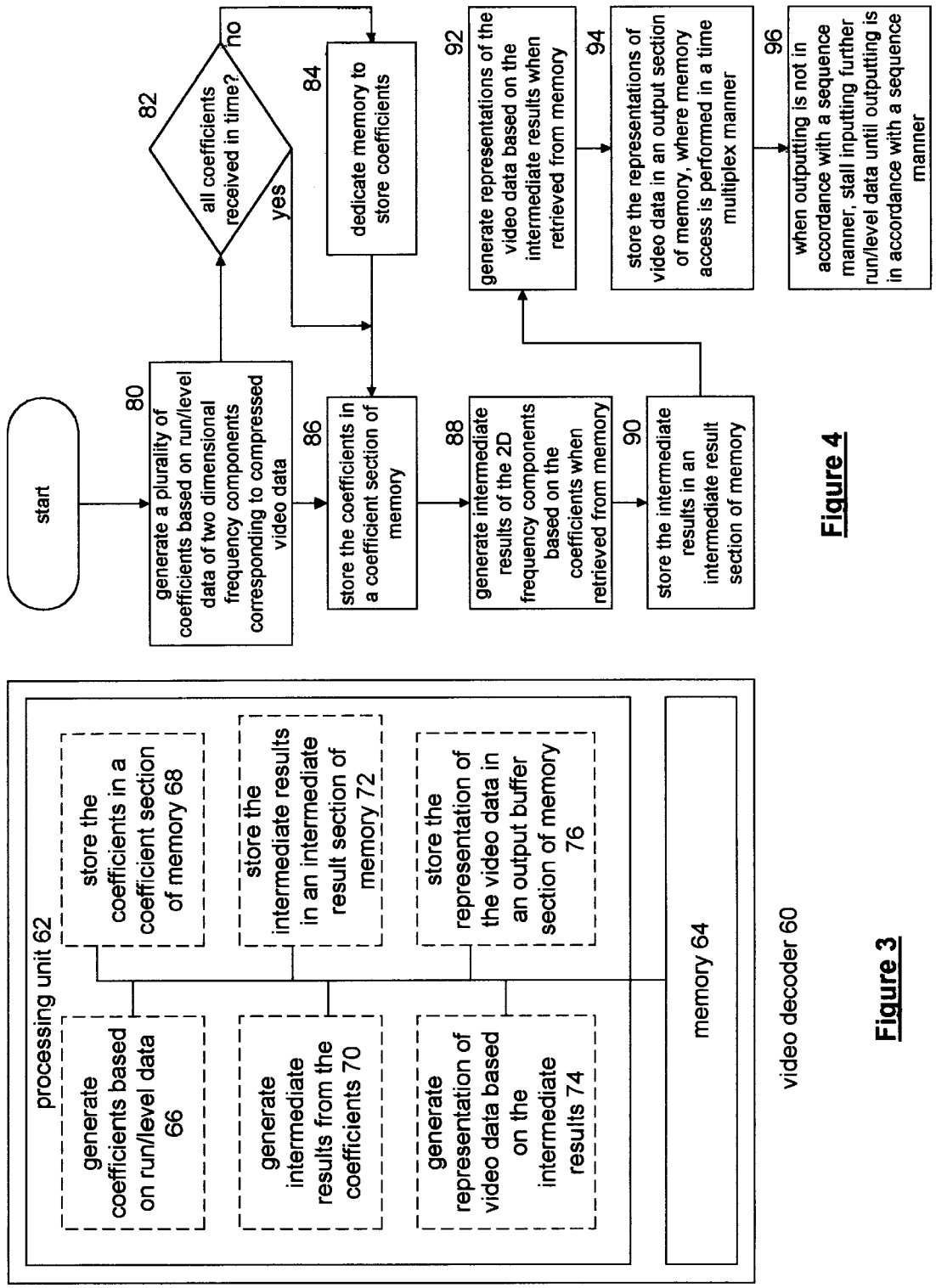

METHOD AND APPARATUS FOR DECODING COMPRESSED VIDEO

TECHNICAL FIELD OF THE INVENTION

This invention relates generally to video decoders and more particularly to decoding of compressed video.

BACKGROUND OF THE INVENTION

Processing of video data is known to include receiving a stream of video data and rendering it such that it may be presented on a display device. The video stream includes a plurality of video frames and/or fields. Typically, video frames are generated for display on a composite display devices, such as CRT monitors, High Definition Televisions, and/or LCD panels, while video fields are typically displayed on interlaced devices such as television sets. For each video frame, or video field, the video data includes information regarding the object-elements (e.g., triangles) that make up the image(s) being rendered. For example, the information may be vertex data of the triangles that includes physical coordinates, texture coordinates, color information/ or alpha-blending information and/or other information needed to render the triangles.

In a computer system, a video graphics processor is operably coupled to receive an uncompressed stream of video data from a central processing unit and/or a video input device, such as a television decoder. Upon receiving the stream of video data, the video graphics processor produces pixel data therefrom and provides the pixel data to the display device. The video graphics processor produces the pixel data by interpreting the object-element parameters, generating pixel data for each pixel of an object-element, and storing the pixel data in a frame buffer until a full frame of data is stored. Such processing is usually done in accordance with the refresh rate of the display, which is typically 50 hertz, 60 hertz, 75 hertz, 90 hertz, etc.

A video graphics processor may also process compressed video data that has been compressed in accordance with the Motion Picture Expert Group (MPEG) 2 standard. In general, the MPEG 2 standard compresses a video frame by encoding the difference between a current video frame and reference video frames. As is known, MPEG 2 provides three types of video frames, an I frame, a P frame, and a B frame. The I frame is an independent frame and is compressed independent of other frames. The P frame is compressed based on differences between it and a reference I frame. The B frame is compressed based on the differences between it, a reference P frame and a reference I frame.

The MPEG 2 standard also prescribes an architecture for an MPEG 2 video decoder. Such a decoder includes a variable length decoding section, inverse scan section, inverse quantization, inverse discreet cosine transform section, motion compensation section, and memory. The implementation of the architecture prescribed by the MPEG 2 standard is costly, in part, due to the cost of the inverse discreet cosine transform function. Such a function requires several separate memory sections to properly process the inverse discrete cosine transform function. Such additional memory requires substantial die area, which increase the cost of implementing the decoder on an integrated circuit.

Therefore, a need exists for a method and apparatus that more efficiently processes the video decoding of compressed video thereby reducing the memory requirements.

BRIEF DESCRIPTION OF THE DRAWING

FIG. 3 illustrates a schematic block diagram of an alternate video decoder in accordance with the present invention; and FIG. 4 illustrates a logic diagram of a method for video decoding in accordance with the present invention.

DETAILED DESCRIPTION OF A PREFERRED EMBODIMENT

Generally, the present invention provides a method and apparatus for video decoding of compressed video data. Such processing begins by generating a plurality of coefficients based on run level data of two-dimensional frequency components corresponding to the compressed video data. As the coefficients are generated, they are stored in a coefficient section of memory. Once the coefficients have been stored, they are utilized to generate intermediate results. As the intermediate results are being generated, they are stored in an intermediate section of the memory. Next, representations of the video data are generated based on the intermediate results and stored in an output section of the memory. The storing and retrieving of the coefficients, intermediate results, and representations of the video data are done in a time multiplexed manner. With such a method and apparatus, a single memory device may be utilized to implement the inverse discreet cosine transform function thereby reducing the die area required to implement the inverse discreet cosine transform function and its associated memory. As such, the overall cost for such a video decoder is reduced.

Figure 1:
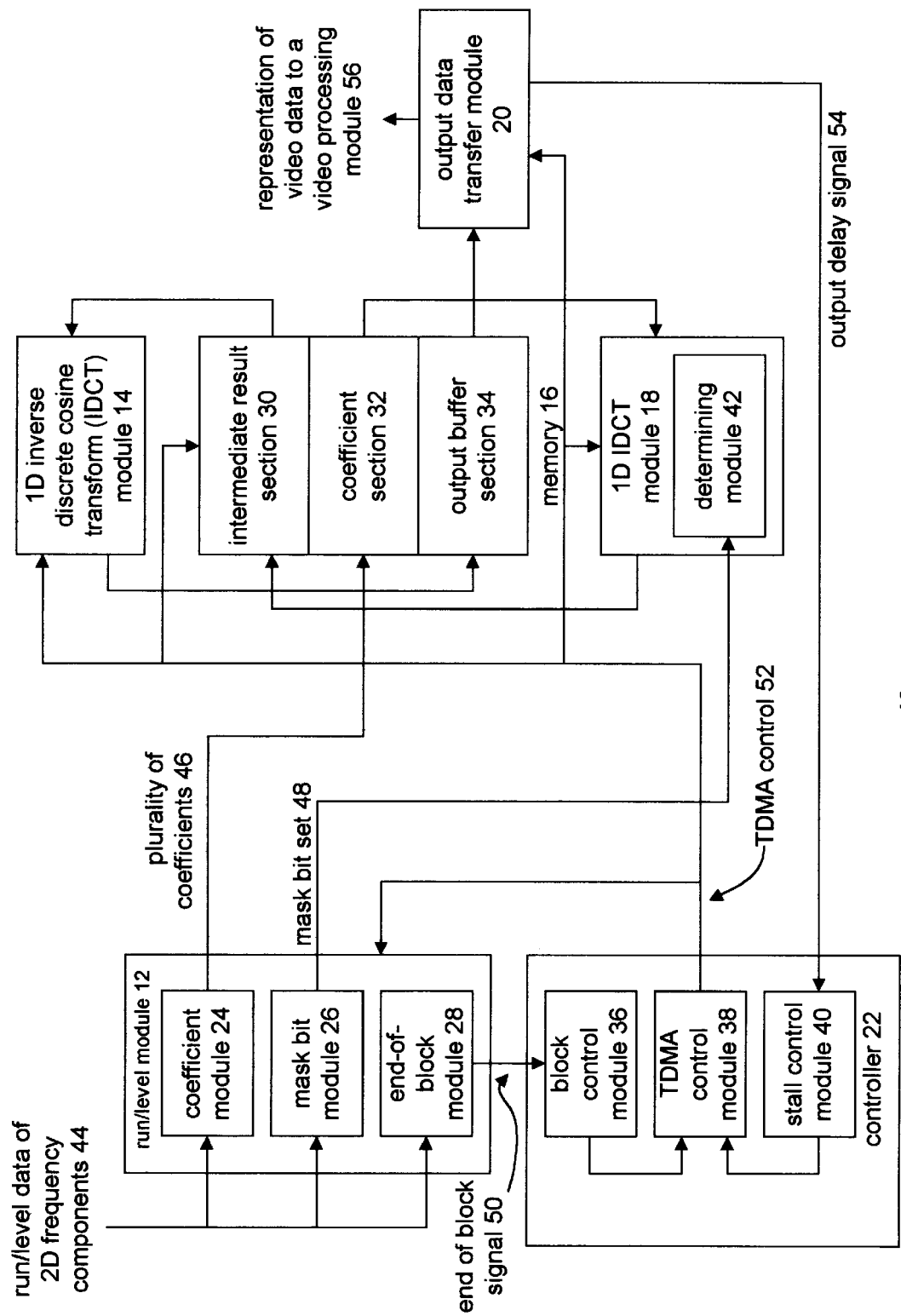
FIG. 1 illustrates a schematic block diagram of a video decoder in accordance with the present invention.

The present invention can be more fully described with reference to FIGS. 1 through 4. FIG. 1 illustrates a schematic block diagram of a video decoder that includes a run/level module 12, a first one-dimensional inverse discreet cosine transform (IDCT) module 14, memory 16, a second one-dimensional IDCT module 18, an output data transfer module 20, and a controller 22. Not shown, but included in the video controller would be a variable length decoder, dequantizer, and a processing module that generates the actual video data for subsequent presentation on a display. Note that the elements of FIG. 1 may be implemented as discreet devices, as hardware devices with associated software, and/or as software modules executed by a central processing unit and/or a coprocessor.

The controller 22 is operably coupled to the run/level module 12, the IDCT modules 14 and 18, the memory 16, and the output module 20. As coupled, the controller 22 controls the run/level module's 12, the IDCT modules' 14 and 18, and the output module's 20 access to memory 16 in a time division multiplex manner. As such, for a given period of time, for example, 64 clock cycles (or operational cycles), the run level module 12 may have access to the memory once every four cycles. Similarly, the first and second IDCT modules 14 and 18 and the output data transfer module 20 would each have access to the memory once every four clock cycles. Alternatively, the memory 16 may include a single write input that is time division multiplex accessed as described, and two read outputs. One of the read outputs would be dedicated to the intermediate result section 30 and the other read output would be shared, in a TDMA manner, between the coefficient section 32 and output buffer section 34.

The run/level module 12 includes a coefficient module 24, a mask bit module 26, and an end of block module 28. Each module 24–28 is operably coupled to receive run level data of two-dimensional frequency components 44 of the compressed video data. Such run level data is known, thus no further discussion will be presented except to illustrate the concepts of the present invention. The coefficient module 24 is operable to produce a plurality of coefficients 46 from the run level data 44 and to store the coefficients in a coefficient section 32 of memory 16 under the control of controller 22. The mask bit module 26 is operable to receive the run level data 44 and to produce therefrom a mask bit set 48. The end of block module 28 is operable to receive the run level data 44 and to produce therefrom an end of block signal 50. The end of block signal 50 indicates when the coefficient module 24 has processed all valid coefficients for a given frame of video data.

The controller 22 includes a block control module 36, a TDMA control module 38, and a stall control module 40. The block control module 36 is operably coupled to receive the end of block signal 50. Upon receiving the signal 50, the block control module 36 determines whether the signal 50 was received within a predetermined number of clock cycles (e.g., 64). If not, the end of block module 36 provides a command to the TDMA control module 38, requesting that the run level module 12 have dedicated access to memory 16 until all of the coefficients of the current video frame have been produced and stored in the coefficient section 32. Note that the TDMA module 38 provides read and/or write enable signals to the modules 12, 14, 18, and 20, such that the modules have TDMA read and/or write access to the memory 16.

The stall control module 40 is operably coupled to receive an output delay signal 54 from the output data transfer module 20. When the signal 54 is received, the stall control module 40 generates a command requesting that the output data transfer module 20 have dedicated access to read from the memory 16 until the outputting of the representations of the video data is in accordance with a sequence manner. In addition, the stalling command causes the TDMA control module 38 to stall inputting of coefficients into the memory section. As such, a command is provided via the TDMA control line 52 to the run level module 12 which causes it to stall inputting the coefficients. The generation of the delay output signal 54 and the sequence manner will be discussed below with reference to the output data transfer module 20.

Once the coefficients for a given block of data (e.g., video frame) has been stored in the coefficient section 32, the one-dimensional IDCT module 18 performs a one-dimensional inverse discreet cosine transform function using the coefficients to produce the intermediate results. Prior to generating the intermediate results, the IDCT module 18 utilizes a determining module 42 to interpret the mask bit set 48. By interpreting the mask bit set 48, the determining module 42 can determine which of the entries of the coefficient section 32 contain valid coefficients for this particular data block(s). As such, only valid coefficients are used when performing the one-dimensional inverse discreet cosine transform function. As the IDCT module 18 produces the intermediate results, its stores them, under the control of the controller 22, in the intermediate section of memory section 16.

The first one-dimensional IDCT module 14 retrieves the intermediate results from memory 16 and produces the representation of the video data, which is stored in the output buffer section 34. The representations of video stored in the output section correspond to I frames, B frames, and P frames of the MPEG 2 standard. As such, the representations of video may include video data and/or error terms.

The output data transfer module 20 is operably coupled to retrieve the representations of video data from the output buffer section 34 and to provide them in a sequenced manner to a video processor that produces the resulting video data. Note that the resulting video data may be in an RGB format, a YUV format, and/or a YCrCb format. Typically, the sequence manner will include outputting a representation of video data once per clock cycle. If the outputting cannot be done in accordance with this sequence manner, the output data transfer module generates an output delay signal 54, which is provided to the stall control module 40. Once the outputting of the representations of video is in accordance with the sequenced manner, the output data transfer module 20 ceases to produce the output delay signal 54.

Figure 2:
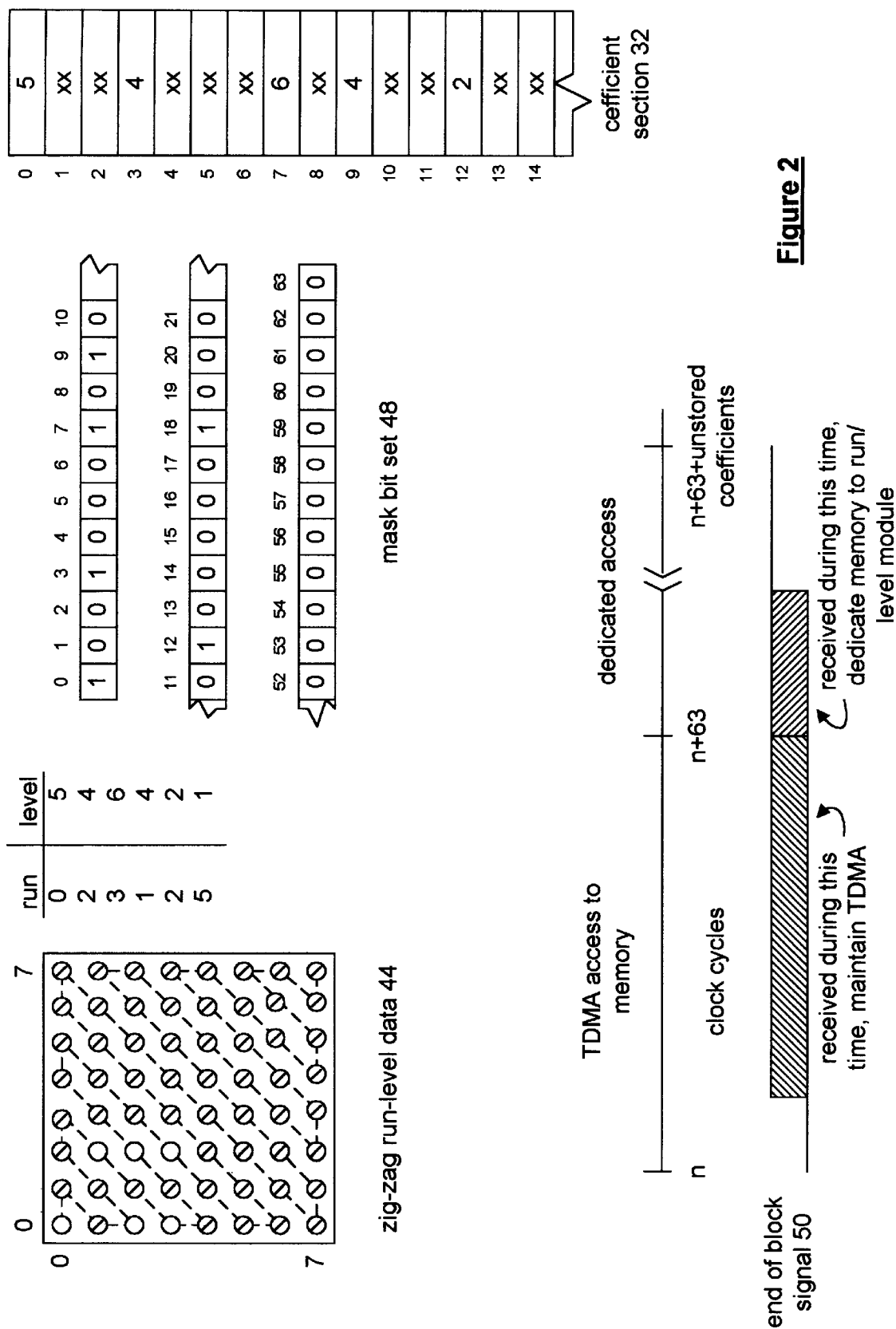
FIG. 2 illustrates a graphical representation of the operation of the video decoder of FIG. 1.

FIG. 2 illustrates a graphical representation of the processing performed by the video decoder of FIG. 1. The run level data 44 is shown in a zigzag pattern, which includes an 8×8 block. Valid coefficients are represented by circles, while invalid coefficients, (i.e., locations that include don't care information) are represented by a circle with a slash. The run level data is encoded as shown in the accompanying chart, where the run column indicates the number of positions to skip and the level column indicates the magnitude of the coefficient, or level of the coefficient. The first entry in the chart corresponds to the first valid coefficient for the current data block. As shown, the first valid coefficient is found at the first entry (coordinates {0, 0} since the run value indicates that no positions are to be skipped) of the zigzag data 44 and has a level of 5. The second valid coefficient is found at location (0, 2), which is determined by following the zigzag pattern and skipping the number of entries indicated by the run value for the second coefficient. As shown, run value is two, such that the next two entries following the first valid entry are to be skipped. The remaining valid coefficients are determined in a like fashion. When the end of the run/level table is reached, the end of block module 28 generates the end of block signal 50.

The next illustration of FIG. 2 corresponds to the mask bit set 48. The mask bit set 48 includes a register containing 64 entries, each entry corresponding to one of the coefficients in the run level data 44. When a location in the zigzag run level data pattern includes a valid coefficient, the corresponding entry in the mask bit set is set to one. For entries that do not contain a valid coefficient the corresponding entry in the mask bit set is set to zero. The mask bit set 48 shown corresponds to the illustrated zigzag run level pattern 44.

When the coefficients are stored in the coefficient section 32, only the valid ones are stored in the appropriate locations of the memory. This is shown in the next illustration of FIG. 2. As shown, the entries store the level value in the corresponding entry of the coefficient section 32. As such, the first entry in coefficient section 32 stores the level five value for the first coefficient, the next two entries in the coefficient section 32 contain don't care information corresponding to invalid coefficients for the current data block. The fourth entry contains the level four for the next valid coefficient. This pattern continues until the entire coefficient section 32 is full for this particular block of data. Alternatively, the level information may be stored in consecutive locations within the coefficient memory 32 and retrieved in such a manner wherein the mask bit set 48 is utilized to determine the proper coefficient numbering. As one of average skill in the art will appreciate, the storage of the data in the coefficient memory 32 may be done in a variety of ways to improve data retrieval, reduce memory requirements, and/or reduce addressing requirements.

The next illustration of FIG. 2 represents a plurality of clock cycles, which for this example includes 64 cycles, and the end of block signal 50. If the end of block signal 50 for the current data block is received prior to the beginning of the 64$^{th}$ clock cycle, the controller 22 maintains the TDMA access to the memory 16. If, however, the end of block signal 50 for the current data block is received after the 64$^{th}$ clock cycle, the controller 22 dedicates access to memory to the run level module 12 until all of the coefficients for the current data block have been processed. Thus, for example, if the run level module has access to the memory once every four cycles, it can store up to 16 coefficients within 64 clock cycles without causing the TDMA access to the memory to be interrupted. If, however, the zigzag run level data 44 includes more than 16 coefficients, the dedicated access would be evoked. Even if the dedicated access is evoked, the maximum number of clock cycles that would require the dedicated access would be 48 (64 minus 16). As one of average skill in the art would appreciate, the number of clock cycles in the predetermined interval may vary, the clock cycles may be operation cycles, and the number of coefficients in the run level data 44 may vary from the 64 illustrated.

FIG. 3 illustrates a schematic block diagram of a video decoder 60 that includes a processing unit 62 and memory 64. The processing unit 62 may be a microprocessor, microcontroller, digital signal processor, microcomputer, central processing unit, and/or any device that manipulates digital information based on programming instructions. The memory 64 may be read-only memory, random access memory, floppy disk memory, hard disk memory, cache memory, external memory, magnetic tape memory, and/or any device that stores digital information.

The memory 64 stores programming instructions that, when read by the processing unit 62, causes the processing unit to function as a plurality of circuits 66–76. While reading the programming instructions, the processing unit 62 functions as circuit 66 to generate a plurality of coefficients based on run level data. The processing unit then functions as circuit 68 to store the coefficients in a coefficient section of memory in a time division multiplex access manner. The processing unit 62 then functions as circuit 70 to generate intermediate results from the coefficients. The processing unit then functions as 72 to store the intermediate results in an intermediate result section of memory. The processing unit then functions as circuit 74 to generate representations of video data based on the intermediate results. The processing unit then functions as circuit 76 to store the representations of video data in an output buffer section of the memory. The programming instructions stored in memory 64 and the execution thereof by the processing unit 62 will be discussed in greater detail with reference to FIG. 4.

FIG. 4 illustrates a logic diagram of a method for decoding compressed video data. The process begins at step 80 where a plurality of coefficients are generated based on run level data of two-dimensional frequency components that correspond to compressed video data. In addition to generating the coefficients, the process also generates a mask bit set that corresponds to entries in the coefficient section, wherein, when a mask bit of the mask bit set is in a first set (e.g., a logic one), the corresponding entry in the coefficient section contains a valid coefficient. The process then proceeds to step 82 and step 86. At step 82, a determination is made as to whether all of the coefficients have been received in time. If not, the process proceeds to step 84 where access to the memory is dedicated to storing the coefficients. At step 80, the coefficients, as they are generated, are stored in a coefficient section of memory wherein the storing is done in a time division multiplex access manner.

The processing steps 82 and 84 may be done by generating an end of block signal when all of the coefficients of the plurality of coefficients have been received for a given video data block of the compressed video data. A determination is then made as to whether the end of block signals was received within a predetermined number of cycles. If not, the time multiplex access to the memory is disabled and dedicated to the run level module such that the plurality of coefficients can be stored in the memory. The dedicated access remains until the end of block signal is received.

The process then proceeds to step 88 where intermediate results of the two-dimensional frequency components are generated based on the coefficients. The intermediate results may be generated by performing a one-dimensional inverse discrete cosine transform utilizing the plurality of coefficients. Further note that the generating of the intermediate results may utilize the mask bit set to determine which of the coefficients stored in the coefficient section of memory are valid for this particular video data block. The process then proceeds to step 90 where the intermediate results are stored in the intermediate results section of memory in the time division multiplex access manner.

The process then proceeds to step 92 where representations of video data are generated based on the intermediate results, which are retrieved from memory in a time division multiplex access manner. Note that the representation of video data may be generated by performing a one-dimensional inverse discreet cosine transform upon the intermediate results. The process then proceeds to step 94 where the representations of video data are stored in an output section of memory. The storing of the representations are performed in a time division multiplex access manner.

The process then proceeds to step 96 where the representations of video data are outputted in a sequence manner. If the outputting of the representations of video data are not in accordance with the sequence manner, the inputting of further run level data is stalled until the outputting of the representations of video data is in accordance with the sequence manner. Note that the sequence manner may be outputting video data once every clock cycle, outputting multiple representations of video data per clock cycle or outputting a representation of video data once every n clock cycles. To determine when the outputting is not in accordance with the sequenced manner, the output may be monitored and if deviated from the sequence, an output delay signal is generated. The output delay signal causes the stalling of the inputting of further run level data. In addition, when the sequence manner has been deviated from, the time division multiplex access to the memory may be disabled wherein the outputting has dedicated access to the memory until the outputting is again in accordance with the sequenced manner.

The preceding discussion has presented a method and apparatus for a video decoder that requires substantially less memory to implement. In particular, the inverse discreet cosine transfer function of an MPEG 2 decoder requires a single memory device, as opposed to three in a previous embodiment, thereby reducing the die area requirements, memory requirements, and cost.

What is claimed is:

1. A video decoder comprises:
   a run/level module operably coupled to receive run/level data of two dimensional frequency components corresponding to compressed video data and produces therefrom a plurality of coefficients; the run/level module further includes an end of block module for generating an end of block signal when all of the coefficients of the plurality of coefficients have been received for a given video data block of the compressed video data;

memory that includes a coefficient section, an intermediate result section, and an output buffer section, wherein the coefficient section stores the plurality of coefficients;

a first one-dimensional inverse discrete cosine transform module operably coupled to receive the plurality of coefficients and to produce therefrom intermediate results of the two-dimensional frequency components of the video data, wherein the intermediate results are stored in the intermediate result section;

a second one-dimensional inverse discrete cosine transform module operably coupled to retrieve the intermediate results from the intermediate result section and to produce therefrom representations of video data, wherein the representations of video data are stored in the output buffer section;

output data transfer module operably coupled to retrieve the representations of the video data and to provide, in a sequenced manner, the representations of the video data to a video processing module;

a controller operably coupled to the run/level module, the memory, the output data transfer module, and the first and second one dimensional inverse discrete cosine transform modules, wherein the controller controls, in a time multiplex manner, access to the memory.

2. The video decoder of claim 1, wherein the controller further comprises a control module operably coupled to receive the end of block signal, wherein the control module determines whether the end of block signal is received within a predetermined number of cycles and when the end of block signal is not received within the predetermined number of cycles, the control module disables the time multiplex access to the memory and dedicates access to the memory to the run/level module until the end of block signal is received.

3. A video decoder comprises:

a run/level module operably coupled to receive run/level data of two dimensional frequency components corresponding to compressed video data and produces therefrom a plurality of coefficients;

memory that includes a coefficient section, an intermediate result section, and an output buffer section, wherein the coefficient section stores the plurality of coefficients;

a first one-dimensional inverse discrete cosine transform module operably coupled to receive the plurality of coefficients and to produce therefrom intermediate results of the two-dimensional frequency components of the video data, wherein the intermediate results are stored in the intermediate result section;

a second one-dimensional inverse discrete cosine transform module operably coupled to retrieve the intermediate results from the intermediate result section and to produce therefrom representations of video data, wherein the representations of video data are stored in the output buffer section;

output data transfer module operably coupled to retrieve the representations of the video data and to provide, in a sequenced manner, the representations of the video data to a video processing module; the output data transfer module further functions to monitor outputting of the representations of the video data and to generate an output delay signal when the outputting of the representations of the video data deviates from the sequence manner; and a controller operably coupled to the run/level module, the memory, the output data transfer module, and the first and second one dimensional inverse discrete cosine transform modules, wherein the controller controls, in a time multiplex manner, access to the memory.

4. The video decoder of claim 3, wherein the controller further comprises a control module operably coupled to receive the output delay signal and to stall inputting of further run/level data until the outputting of the representations of the video data is in accordance with the sequence manner.

5. The video decoder of claim 3, wherein the controller further comprises a control module operably coupled to receive the output delay signal, to disable the time multiplex access to the memory, and to dedicate access to the memory to the output data transfer module until the outputting of the representations of the video data is in accordance with the sequence manner.

6. A video decoder comprises:

a run/level module operably coupled to receive run/level data of two dimensional frequency components corresponding to compressed video data and produces therefrom a plurality of coefficients, the run/level module further functions to provide a mask bit set corresponding to entries in the coefficient section, wherein, when a mask bit of the mask bit set is in a first state, a corresponding entry in the coefficient section contains a valid coefficient;

memory that includes a coefficient section, an intermediate result section, and an output buffer section, wherein the coefficient section stores the plurality of coefficients;

a first one-dimensional inverse discrete cosine transform module operably coupled to receive the plurality of coefficients and to produce therefrom intermediate results of the two-dimensional frequency components of the video data, wherein the intermediate results are stored in the intermediate result section;

a second one-dimensional inverse discrete cosine transform module operably coupled to retrieve the intermediate results from the intermediate result section and to produce therefrom representations of video data, wherein the representations of video data are stored in the output buffer section;

output data transfer module operably coupled to retrieve the representations of the video data and to provide, in a sequenced manner, the representations of the video data to a video processing module; and a controller operably coupled to the run/level module, the memory, the output data transfer module, and the first and second one dimensional inverse discrete cosine transform modules, wherein the controller controls, in a time multiplex manner, access to the memory.

7. The video decoder of claim 6, where the first one-dimensional inverse discrete cosine transform module further comprises a determining module operably coupled to receive the mask bit set and to determine valid coefficients therefrom.

8. A method for decoding compressed video, the method comprises the steps of:

a) generating a plurality of coefficients based on run/level data of two dimensional frequency components corresponding to compressed video data;

b) storing the plurality of coefficients in a coefficient section of memory;

c) generating intermediate results of the two dimensional frequency components based on the plurality of coefficients when the plurality of coefficients have been retrieved from the coefficient section of memory;

d) storing the intermediate results in an intermediate section of the memory;

e) generating representations of the video data based on the intermediate results when the intermediate results are retrieved from the intermediate section;

f) storing the representations of the video data in an output section of the memory, wherein the storing in, and retrieving from, the memory of the plurality of coefficients, the intermediate results, and the representations of the video data are performed in a time multiplex manner;

g) generating an end of block signal when all of the coefficients of the plurality of coefficients have been received for a given video data block of the compressed video data; and h) determining whether the end of block signal was received within a predetermined number of cycles; and disabling time multiplex access to the memory when the end of block signal is not received within the predetermined number of cycles and dedicating access to the memory for receiving the plurality of coefficients until the end of block signal is received.

9. The method of claim 8 further comprises:

g) monitoring outputting of the representations of the video data;

h) generating an output delay signal when the outputting of the representations of the video data deviates from a sequence manner; and i) stalling inputting of further run/level data until the outputting of the representations of the video data is in accordance with the sequence manner.

10. The method of claim 8:

g) providing a mask bit set corresponding to entries in the coefficient section, wherein, when a mask bit of the mask bit set is in a first state, a corresponding entry in the coefficient section contains a valid coefficient; and h) determining valid coefficients in the coefficient section based on the mask bit set; and wherein:

step (c) further comprises generating the intermediate results by performing a one-dimensional inverse discrete cosine transform upon the plurality of coefficients, step (e) further comprises generating the representation of the video data by performing a one-dimensional inverse discrete cosine transform upon the intermediate results.

11. A method for decoding compressed video, the method comprises the steps of:

a) generating a plurality of coefficients based on run/level data of two dimensional frequency components corresponding to compressed video data;

b) storing the plurality of coefficients in a coefficient section of memory;

c) generating intermediate results of the two dimensional frequency components based on the plurality of coefficients when the plurality of coefficients have been retrieved from the coefficient section of memory;

d) storing the intermediate results in an intermediate section of the memory;

e) generating representations of the video data based on the intermediate results when the intermediate results are retrieved from the intermediate section;

f) storing the representations of the video data in an output section of the memory, wherein the storing in, and retrieving from, the memory of the plurality of coefficients, the intermediate results, and the representations of the video data are performed in a time multiplex manner;

g) monitoring outputting of the representations of the video data;

h) generating an output delay signal when the outputting of the representations of the video data deviates from a sequence manner; and i) stalling inputting of further run/level data until the outputting of the representations of the video data is in accordance with the sequence manner.

12. The method of claim 11 further comprises:

disabling time multiplex access to the memory; and dedicating access to outputting the representations of the video data until the outputting is in accordance with the sequence manner.

13. A method for decoding compressed video, the method comprises the steps of:

a) generating a plurality of coefficients based on run/level data of two dimensional frequency components corresponding to compressed video data;

b) storing the plurality of coefficients in a coefficient section of memory;

c) generating intermediate results of the two dimensional frequency components based on the plurality of coefficients when the plurality of coefficients have been retrieved from the coefficient section of memory;

d) storing the intermediate results in an intermediate section of the memory;

e) generating representations of the video data based on the intermediate results when the intermediate results are retrieved from the intermediate section; and f) storing the representations of the video data in an output section of the memory, wherein the storing in, and retrieving from, the memory of the plurality of coefficients, the intermediate results, and the representations of the video data are performed in a time multiplex manner;

g) providing a mask bit set corresponding to entries in the coefficient section, wherein, when a mask bit of the mask bit set is in a first state, a corresponding entry in the coefficient section contains a valid coefficient; and h) determining valid coefficients in the coefficient section based on the mask bit set.

14. The method of claim 13 further comprises:

g) monitoring outputting of the representations of the video data;

h) generating an output delay signal when the outputting of the representations of the video data deviates from a sequence manner; and i) stalling inputting of further run/level data until the outputting of the representations of the video data is in accordance with the sequence manner.

15. The method of claim 13, further comprising:

g) generating an end of block signal when all of the coefficients of the plurality of coefficients have been received for a given video data block of the compressed video data; and h) determining whether the end of block signal was received within a predetermined number of cycles; and disabling time multiplex access to the memory when the end of block signal is not received within the predetermined number of cycles and dedicating access to the memory for receiving the plurality of coefficients until the end of block signal is received.

16. A video decoder comprises:

a processing module;

memory operably coupled to the processing module, wherein the memory stores programming instructions that, when read by the processing module, cause the processing module to (a) generate a plurality of coefficients based on run/level data of two dimensional frequency components corresponding to compressed video data; (b) store the plurality of coefficients in a coefficient section of memory; (c) generate intermediate results of the two dimensional frequency components based on the plurality of coefficients when the plurality of coefficients have been retrieved from the coefficient section of memory; (d) store the intermediate results in an intermediate section of the memory; (e) generate representations of the video data based on the intermediate results when the intermediate results are retrieved from the intermediate section; and (f) store the representations of the video data in an output section of the memory, wherein the storing in, and retrieving from, the memory of the plurality of coefficients, the intermediate results, and the representations of the video data are performed in a time multiplex manner, the memory further comprises programming instructions that cause the processing module to:

generate an end of block signal when all of the coefficients of the plurality of coefficients have been received for a given video data block of the compressed video data; and determine whether the end of block signal was received within a predetermined number of cycles; and disable time multiplex access to the memory when the end of block signal is not received within the predetermined number of cycles and dedicating access to the memory for receiving the plurality of coefficients until the end of block signal is received.

17. The video decoder of claim 16, wherein monitor outputting of the representations of the video data;

generate an output delay signal when the outputting of the representations of the video data deviates from a sequence manner;

stall inputting of further run/level data until the outputting of the representations of the video data is in accordance with the sequence manner;

disable time multiplex access to the memory; and dedicate access to outputting the representations of the video data until the outputting is in accordance with the sequence manner.

18. The video decoder of claim 16, wherein the memory further comprises programming instructions that cause the processing module to provide a mask bit set corresponding to entries in the coefficient section, wherein, when a mask bit of the mask bit set is in a first state, a corresponding entry in the coefficient section contains a valid coefficient; and the memory further comprises programming instructions that cause the processing module to determine valid coefficients in the coefficient section based on the mask bit set;

the programming instructions that, when read by the processing module, cause the processing module to (c) generate intermediate results of the two dimensional frequency components based on the plurality of coefficients when the plurality of coefficients have been retrieved from the coefficient section of memory; further comprises generating the intermediate results by performing a one-dimensional inverse discrete cosine transform upon the plurality of coefficients; and the programming instructions that, when read by the processing module, cause the processing module to (e) generate representations of the video data based on the intermediate results when the intermediate results are retrieved from the intermediate section, further comprises generating the representation of the video data by performing a one-dimensional inverse discrete cosine transform upon the intermediate results.

19. A video decoder comprises:

a processing module;

memory operably coupled to the processing module, wherein the memory stores programming instructions that, when read by the processing module, cause the processing module to (a) generate a plurality of coefficients based on run/level data of two dimensional frequency components corresponding to compressed video data; (b) store the plurality of coefficients in a coefficient section of memory; (c) generate intermediate results of the two dimensional frequency components based on the plurality of coefficients when the plurality of coefficients have been retrieved from the coefficient section of memory; (d) store the intermediate results in an intermediate section of the memory; (e) generate representations of the video data based on the intermediate results when the intermediate results are retrieved from the intermediate section; and (f) store the representations of the video data in an output section of the memory, wherein the storing in, and retrieving from, the memory of the plurality of coefficients, the intermediate results, and the representations of the video data are performed in a time multiplex manner; the memory further comprises programming instructions that cause the processing module to:

monitor outputting of the representations of the video data;

generate an output delay signal when the outputting of the representations of the video data deviates from a sequence manner; and stall inputting of further run/level data until the outputting of the representations of the video data is in accordance with the sequence manner.

20. The video decoder of claim 19, wherein the memory further comprises programming instructions that cause the processing module to:

disable time multiplex access to the memory; and dedicate access to outputting the representations of the video data until the outputting is in accordance with the sequence manner.

21. A video decoder comprises:

a processing module;

memory operably coupled to the processing module, wherein the memory stores programming instructions that, when read by the processing module, cause the processing module to (a) generate a plurality of coefficients based on run/level data of two dimensional frequency components corresponding to compressed video data; (b) store the plurality of coefficients in a coefficient section of memory; (c) generate intermediate results of the two dimensional frequency components based on the plurality of coefficients when the plurality of coefficients have been retrieved from the coefficient section of memory; (d) store the intermediate results in an intermediate section of the memory; (e) generate representations of the video data based on the intermediate results when the intermediate results are retrieved from the intermediate section; and (f) store the representations of the video data in an output section of the memory, wherein the storing in, and retrieving from, the memory of the plurality of coefficients, the intermediate results, and the representations of the video data are performed in a time multiplex manner; the memory further comprises programming instructions that cause the processing module to:

provide a mask bit set corresponding to entries in the coefficient section, wherein, when a mask bit of the mask bit set is in a first state, a corresponding entry in the coefficient section contains a valid coefficient; and determine valid coefficients in the coefficient section based on the mask bit set.

22. The video decoder of claim 21, wherein:

the memory further comprises programming instructions that cause the processing module to:

monitor outputting of the representations of the video data;

generate an output delay signal when the outputting of the representations of the video data deviates from a sequence manner;

stall inputting of further run/level data until the outputting of the representations of the video data is in accordance with the sequence manner;

disable time multiplex access to the memory;

dedicate access to outputting the representations of the video data until the outputting is in accordance with the sequence manner; and disable time multiplex access to the memory; and dedicate access to outputting the representations of the video data until the outputting is in accordance with the sequence manner.

23. The video decoder of claim 21, wherein the memory further comprises programming instructions that cause the processing module to:

generate the intermediate results by performing a one-dimensional inverse discrete cosine transform upon the plurality of coefficients; and generate the representation of the video data by performing a one-dimensional inverse discrete cosine transform upon the intermediate results.

* * * * *